(12) United States Patent
Nogami et al.

(10) Patent No.: US 9,722,477 B2
(45) Date of Patent: Aug. 1, 2017

(54) STEPPING MOTOR

(71) Applicant: Shinobu Nogami, Tone-gun, Gunma (JP)

(72) Inventors: Masakazu Nogami, Tone-gun (JP); Takeo Kogure, Numata (JP)

(73) Assignee: Shinobu Nogami, Tone-gun (JP)

( * ) Notice: Subject to any disclaimer, the term of this patent is extended or adjusted under 35 U.S.C. 154(b) by 0 days.

(21) Appl. No.: 14/772,463

(22) PCT Filed: Feb. 25, 2015

(86) PCT No.: PCT/JP2015/055319
§ 371 (c)(1),
(2) Date: Sep. 3, 2015

(87) PCT Pub. No.: WO2015/194210
PCT Pub. Date: Dec. 23, 2015

(65) Prior Publication Data
US 2017/0110954 A1 Apr. 20, 2017

(30) Foreign Application Priority Data
Jun. 19, 2014 (JP) ................................. 2014-126637

(51) Int. Cl.
*H02K 37/12* (2006.01)
*H02K 3/18* (2006.01)
(Continued)

(52) U.S. Cl.
CPC ............... *H02K 37/12* (2013.01); *H02K 1/14* (2013.01); *H02K 1/27* (2013.01); *H02K 3/18* (2013.01)

(58) Field of Classification Search
CPC H02K 37/00–37/24; H02K 1/14; H02K 1/27; H02K 3/18
(Continued)

(56) References Cited

U.S. PATENT DOCUMENTS 6,515,390 B1 * 2/2003 Lopatinsky ............ H02K 37/18
310/156.37
2003/0169011 A1   9/2003 Hori
2004/0195921 A1   10/2004 Huang et al.

FOREIGN PATENT DOCUMENTS

AU   WO 2010068988 A1 *   6/2010   ............. H02K 1/278
JP       10-243625 A       9/1998
(Continued)

OTHER PUBLICATIONS

Machine Translation, SENDA, JP 10243625 A, Sep. 11, 1998.*
(Continued)

*Primary Examiner* — Thomas Truong
(74) *Attorney, Agent, or Firm* — Westerman, Hattori, Daniels & Adrian, LLP

(57) ABSTRACT

[Problem] To provide a high-efficiency stepping motor in which a magnetic force of an exciting coil is made to effectively contribute to a rotating operation of a rotator.

[Solution] The present stepping motor (50) uses permanent magnets (22) having inside a substantially cylindrical inner peripheral surface, and is disposed with a substantially columnar exciting coil (26) inside the inner peripheral surface. Moreover, turning on/off of current application to the exciting coil (26) and the application direction are switched when the permanent magnet (22) and the exciting coil (26) have reached a specific position. Repulsion and attraction that act on both ends of the exciting coil (26) can thereby be made to contribute to a rotary motion of the stepping motor (50). Therefore, the stepping motor (50) can obtain a high conversion efficiency.

1 Claim, 4 Drawing Sheets

(51) Int. Cl.
*H02K 1/27* (2006.01)
*H02K 1/14* (2006.01)

(58) Field of Classification Search
USPC .......................................... 310/49.01–49.55
See application file for complete search history.

(56) References Cited

FOREIGN PATENT DOCUMENTS

| JP | 11-168870 A | 6/1999 |
|----|-------------|--------|
| JP | 4873671 B1  | 2/2012 |

OTHER PUBLICATIONS

International Search Report and Written Opinion dated May 26, 2015, issued in counterpart Application No. PCT/JP2015/055319 (6 pages).

\* cited by examiner (a)

(b)

(a)

(b)

(c)

(a)

(b)

STEPPING MOTOR

TECHNICAL FIELD

The present invention relates to a stepping motor that rotates by magnetization of an exciting coil.

BACKGROUND ART

Stepping motors on a rotator side of which a permanent magnet is disposed, on a stator side of which an exciting coil is disposed, and which rotate the rotator by controlling turning on/off etc., of the exciting coil, described in, for example, the following [Patent Document 1], have been put into practical use. Also, the present inventors have made an invention relating to a power generator having high conversion efficiency for which coils are arranged in a horizontally directed manner between permanent magnets with the same poles facing each other [Patent Document 2].

PRIOR ART DOCUMENTS

Patent Documents

[Patent Document 1] Japanese Published Unexamined Patent Application No. H11-168870
[Patent Document 2] Japanese Patent No. 4873671

SUMMARY OF THE INVENTION

Problem(s) to be Solved by the Invention

However, the conventional stepping motors as disclosed in [Patent Document 1] have a problem such that a magnetic flux that contributes to rotation has a large leakage and the efficiency is thus poor. The present invention has been made in view of the actual circumstances described above, and an object thereof is to provide a high-efficiency stepping motor in which a magnetic force of an exciting coil is made to effectively contribute to a rotating operation of a rotator.

Means for Solving the Problem(s)

The present invention solves the problem described above by providing a stepping motor 50 which is (1) a stepping motor including a rotary shaft 10 pivotally supported on a stator 12, a rotating plate 20 fixed to the rotary shaft 10, a plurality of permanent magnets 22 fixed to the rotating plate 20 and disposed at equal intervals concentrically around the rotary shaft 10 and so as to have alternating magnetic polarities, and a plurality of exciting coils 26 fixed to the stator 12 and being in substantially columnar shapes, in which the permanent magnet 22 has an inner peripheral surface that is homopolar inside and in a substantially C-shape, the exciting coil 26 is disposed inside the inner peripheral surface of the permanent magnet 22, and the rotating plate 20 rotates as a result of the permanent magnet 22 moving such that the exciting coil 26 passes by inside the inner peripheral surface due to magnetization of the exciting coil 26, and is characterized in that the exciting coil 26 has a length slightly longer than a pitch interval L of the permanent magnets 22 adjacent to each other, and where, of both ends of the exciting coil 26, a side of the exciting coil 26 toward which the permanent magnet 22 heads is provided as a front end 26a, and a side from which the permanent magnet 22 separates is provided as a rear end 26b and a side of both ends of the permanent magnet 22 that heads toward the exciting coil 26 is provided as a front end, the exciting coil 26 is excited such that, when a substantially center of the permanent magnet 22 has reached a position slightly beyond the rear end 26b of the exciting coil 26, the front end 26a and rear end 26b of the exciting coil 26 and permanent magnets 22 located at both end portions of the exciting coil 26 respectively repel, and when the front end of the permanent magnet 22 has reached a position substantially equal to the rear end 26b of the exciting coil 26, excitement of the exciting coil 26 is stopped.

Effect of the Invention

The stepping motor according to the present invention is formed with a substantially cylindrical inner peripheral surface inside a permanent magnet, and is disposed with a substantially columnar exciting coil inside the inner peripheral surface. Repulsion and attraction of magnetic poles at both ends of the exciting coil can thereby be made to contribute to a rotary motion of the stepping motor, so that a high conversion efficiency can be obtained.

MODE FOR CARRYING OUT THE INVENTION

Figure 1:
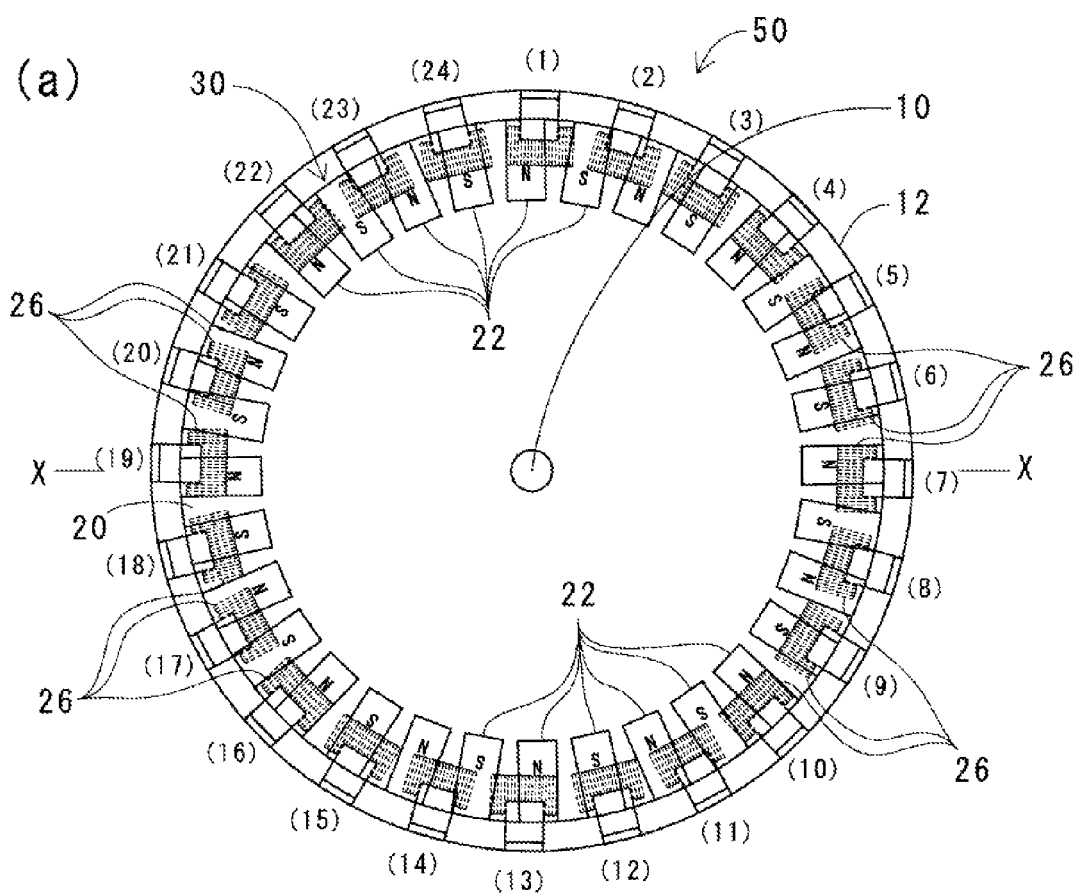
FIG. 1 includes schematic configuration views of a stepping motor according to the present invention.
Figure 1:
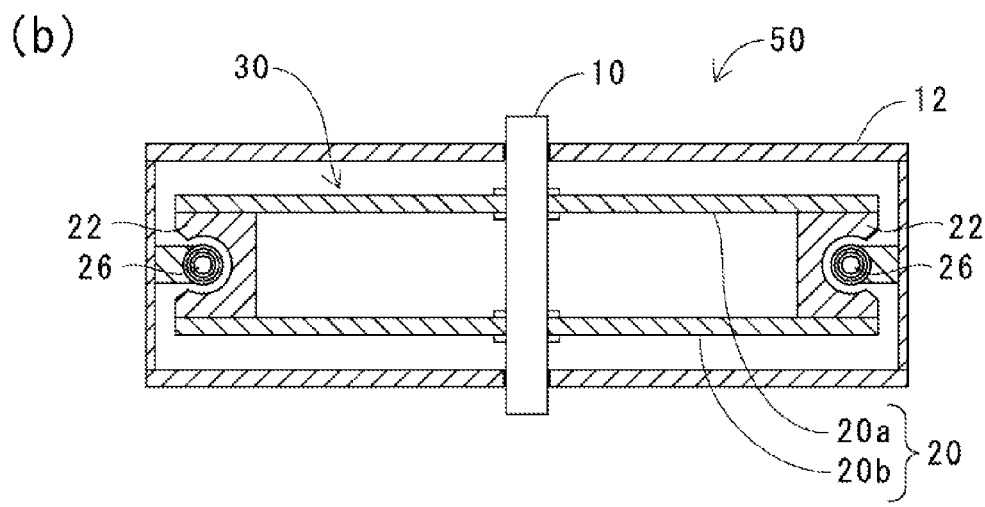

A stepping motor according to the present invention will be described based on the drawings. FIG. 1(a) is a schematic top view of the stepping motor 50 according to the present invention. On the other hand, FIG. 1(b) is an X-X sectional view of the stepping motor 50 according to the present invention. In addition, in FIG. 1(a), permanent magnets 22 to be described later are shown by solid lines, and a configuration regarding exciting coils 26 located within a rotator 30 is shown by broken lines.

The stepping motor 50 according to the present invention includes a rotary shaft 10 pivotally supported on a stator 12, a rotating plate 20 fixed to the rotary shaft 10, a plurality of permanent magnets 22 fixed to the rotating plate 20, and a plurality of exciting coils 26 fixed to the stator 12. Moreover, the permanent magnets 22 are installed at equal intervals concentrically around the rotary shaft 10 and so as to have alternating magnetic polarities. In addition, it is preferable from the aspect of strength that the rotating plate 20 is composed of a first rotating plate 20a and a second rotating plate 20b, and the first rotating plate 20a and the second rotating plate 20b sandwich and hold the permanent magnets 22.

Also, the exciting coils 26 are installed at equal intervals concentrically around the rotary shaft 10 and such that magnetic cores are directed horizontally (tangentially to the concentric circle). In addition, the ratio in the number of permanent magnets 22 and exciting coils 26 can be any, such as 3:2 or 5:3. However, an example is shown here in which the ratio in the number of permanent magnets 22 and exciting coils 26 is previously set as 4:3, and the exciting coils 26 consist of three phase groups that are identical in positional relationship with respect to the permanent magnets 22, and these exciting coils 26 are arranged with a uniform distribution. That is, FIG. 1(a) shows an example in which 32 permanent magnets 22 and 24 exciting coils 26 are installed, and exciting coils 26(1), (4), (7), (10), (13), (16), (19), and (22) constitute a first phase group, exciting coils 26(2), (5), (8), (11), (14), (17), (20), and (23) constitute a second phase group, and exciting coils 26(3), (6), (9), (12), (15), (10), (21), and (24) constitute a third phase group.

Figure 2:
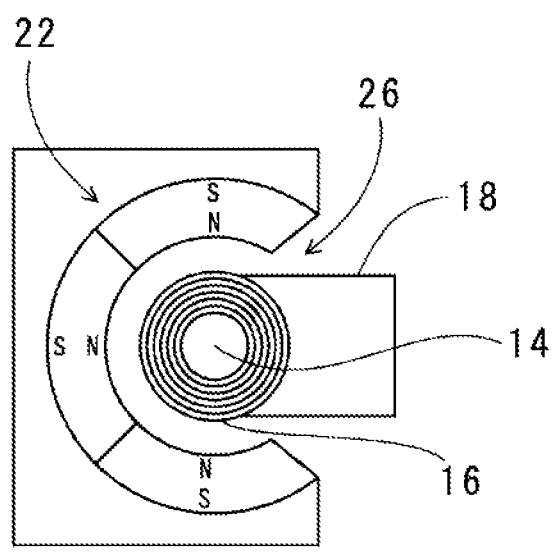
FIG. 2 is a view describing a configuration of a permanent magnet and an exciting coil of the stepping motor according to the present invention.

Next, a configuration of the magnetic coil 22 and the exciting coil 26 will be described using FIG. 2. Here, FIG. 2 is a partially enlarged view of the permanent magnet 22 and the exciting coil 26. The permanent magnet 22 shown in FIG. 2 has a substantially cylindrical inner peripheral surface, and the inner cylindrical surface shows a substantially C-shape in which a part of the peripheral surface is opened along an axial direction. Moreover, the substantially C-shaped inner peripheral surface is configured with the same magnetic polarity throughout. Although FIG. 2 shows an example in which three permanent magnets having substantially fan shapes in section are arranged to form a permanent magnet 22, the permanent magnet 22 of the present invention is not limited to this configuration, and an integrally formed permanent magnet 22 may be used.

Also, the exciting coil 26 is composed of a substantially columnar magnetic core 14 and a winding 16 wound around the magnetic core 14, and shows a substantially columnar shape as a whole. In addition, as the magnetic core 14, a well-known ferrite core or the like maybe used, but preferably, silicon steel or silicon steel plates bonded together into a columnar shape is preferably used from the perspective of suppressing heat generation due to eddy current. Moreover, the exciting coil 26 is fixed to the stator 12 via a coil stay 18 passed through the opening portion of the permanent magnet 22. The exciting coil 26 is thereby held inside the inner peripheral surface of the permanent magnet 22 in a state out of contact with the permanent magnet 22. In addition, there is provided a sufficient gap between the exciting coil 26 and the inner peripheral surface of the permanent magnet 22, so that the inner peripheral surface and the exciting coil 26 do not contact each other even when the permanent magnet 22 rotates. Moreover, when the permanent magnet 22 rotates to move around the rotary shaft 10, the exciting coils 26 sequentially pass by inside the inner peripheral surface of the permanent magnet 22 while being maintained in the state of out of contact therewith. Also, lead wires at both ends of the winding 16 being a component of the exciting coil 26 are respectively connected to a control mechanism that controls turning on/off of current application to the exciting coil 26 and the application direction.

Next, operation of the stepping motor 50 according to the present invention will be described using FIG. 3. Although, in FIG. 3, a single exciting coil 26 is illustrated for description, the exciting coil 26 has exciting coils 26 that exist in different phases as described above, and as a result of these exciting coils 26 sequentially performing the following operation, the stepping motor 50 continuously performs a rotating operation.

Figure 3:
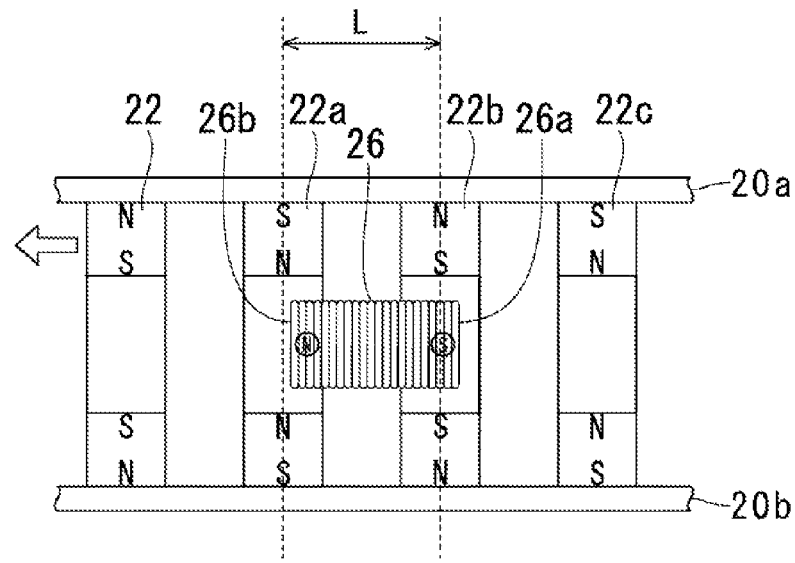
FIG. 3 includes views describing a rotating operation of the stepping motor according to the present invention.
Figure 3:
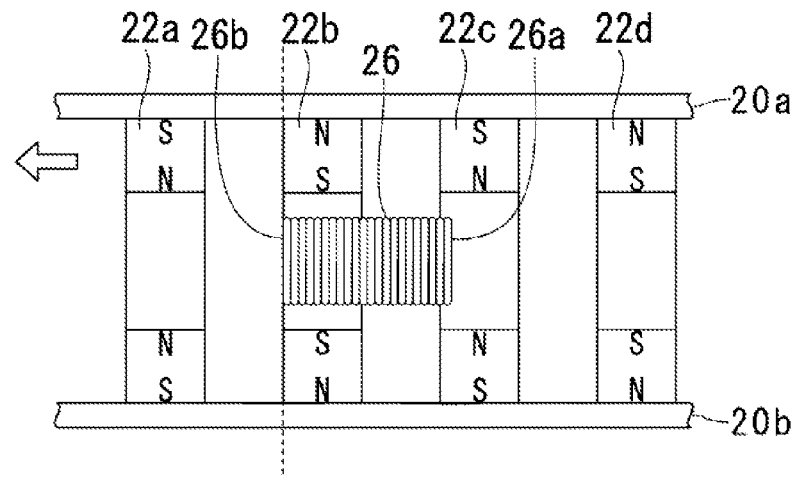
Figure 3:
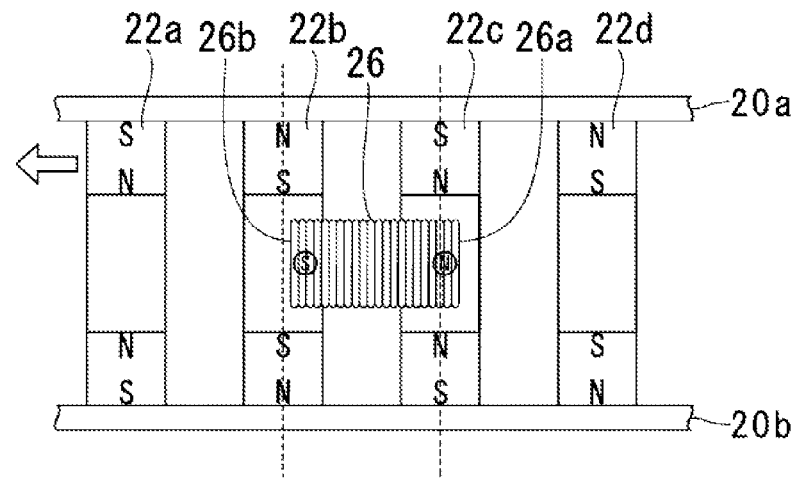

First, the exciting coil 26 is formed, as shown in FIG. 3(a), with a length slightly longer than a pitch interval L of adjacent permanent magnets 22, that is, a center-to-center distance L of adjacent permanent magnets 22. Here, of both ends of the exciting coil 26, a side (right-hand side in FIG. 3) of the exciting coil 26 toward which the permanent magnet 22 heads is provided as a front end 26a, and a side (left-hand side in FIG. 3) from which the permanent magnet 22 separates is provided as a rear end 26b. Moreover, in the stepping motor 50 according to the present invention, when the exciting coil 26 has reached a state in FIG. 3(a), that is, a substantially center position of the permanent magnet 22 (22a) has become a position. slightly beyond the rear end 26b of the exciting coil 26, the control mechanism applies a predetermined current to the winding 16 of the exciting coil 26 to excite the exciting coil 26. The current application direction at this time is a direction in which a magnetic pole of the front end 26a of the exciting coil 26 and a magnetic pole of the inner peripheral surface of a permanent magnet 22b located at this front end 26a have the same polarity, and a magnetic pole of the rear end 26b of the exciting coil 26 and a magnetic pole of the inner peripheral surface of a permanent magnet 22a located at this rear end 26b have the same polarity. Here, in FIG. 3(a), because the inner peripheral surface of the permanent magnet 22b is an S-pole and the inner peripheral surface of the permanent magnet 22a is an N-pole, the control mechanism applies a current in a direction to make the front end 26a of the exciting coil 26 be an S-pole and make the rear end 26b be an N-pole.

The front end 26a of the exciting coil 26 is thereby excited to be an S-pole and the rear end 26b is excited to be an N-pole, and repulsion acts between the front end 26a of the exciting coil 26 and the inner peripheral surface of the permanent magnet 22b to cause mutual repelling. Similarly, repulsion acts between the rear end 26b of the exciting coil 26 and the inner peripheral surface of the permanent magnet 22a to cause mutual repelling. At this time, because the exciting coil 26 is at a position slightly beyond the substantially center position of the permanent magnet 22a and the length of the exciting coil 26 is longer than the pitch interval L of the permanent magnet 22, the front end 26a of the exciting coil 26 projects further to the side of a permanent magnet 22c than a center of the permanent magnet 22b. Moreover, because the permanent magnet 22c has a magnet pole that is opposite in polarity direction to the magnet pole of the permanent magnet 22b, attraction acts between the front end 26a of the exciting coil 26 and the inner peripheral surface of the permanent magnet 22c, and as a result, the permanent magnet 22c is attracted to the side of the exciting coil 26. Moreover, due to the action of attraction and repulsion, the permanent magnets 22a, 22b, and 22c rotate to move in the direction of the arrow in FIG. 3 around the rotary shaft 10 together with the rotating plate 20. The rotator 30 thereby performs a rotating operation, and the rotary shaft 10 of the stepping motor 50 rotates.

Next, of both ends of the permanent magnet 22, a side (left-hand side in FIG. 3) that heads toward the exciting coil 26 is provided as a front end. Moreover, when the front end of the permanent magnet 22 (22b) has reached a position substantially equal to the rear end 26b of the exciting coil 26 as shown in FIG. 3(b) due to the above-described rotating operation, the control mechanism stops the current application to the exciting coil 26.

Next, the permanent magnets 22 (22a, 22b, and 22c) rotate to move due to an exciting operation and the like of the exciting coil 26 in another phase to reach a state shown in FIG. 3(c). In the state shown in FIG. 3(c), a substantially center position of the permanent magnet 22b is a position slightly beyond the rear end 26b of the exciting coil 26. At this time, the control mechanism applies a predetermined current to the winding 16 of the exciting coil 26 to excite the exciting coil 26. The current application direction at this time is a direction in which a magnetic pole of the front end 26a of the exciting coil 26 and a magnetic pole of the inner peripheral surface of the permanent magnet 22c. located at this front end 26a have the same polarity and a magnetic pole of the rear end 26b of the exciting coil 26 and a magnetic pole of the inner peripheral surface of the permanent magnet 22b located at this rear end 26b have the same polarity. Here, in FIG. 3(c), because the inner peripheral surface of the permanent magnet 22c is an N-pole and the inner peripheral surface of the permanent magnet 22b is an S-pole, the control mechanism applies a current in a direction to make the front end 26a of the exciting coil 26 be an N-pole and make the rear end 26b be an S-pole, i.e., a direction opposite to that in FIG. 3(a).

The rear end 26b of the exciting coil 26 is thereby excited to be an S-pole and the front end 26a is excited to be an N-pole, and repulsion acts between the front end 26a of the exciting coil 26 and the inner peripheral surface of the permanent magnet 22c to cause mutual repelling. Similarly, repulsion acts between the rear end 26b of the exciting coil 26 and the inner peripheral surface of the permanent magnet 22b to cause mutual repelling. Further, attraction acts between the front end 26a of the exciting coil 26 and the inner peripheral surface of a permanent magnet 22d to cause mutual attraction. Due to the action of attraction and repulsion, the permanent magnets 22b, 22c, and 22d rotate to move in the direction of the arrow in FIG. 3 around the rotary shaft 10 together with the rotating plate 20. The rotator 30 thereby performs a rotating operation, and the rotary shaft 10 of the stepping motor 50 rotates. Moreover, the rotary shaft 10 continuously performs a rotating operation as a result of these operations being repeatedly performed for exciting coils 26 including also the exciting coils 26 in another phase.

Figure 4:
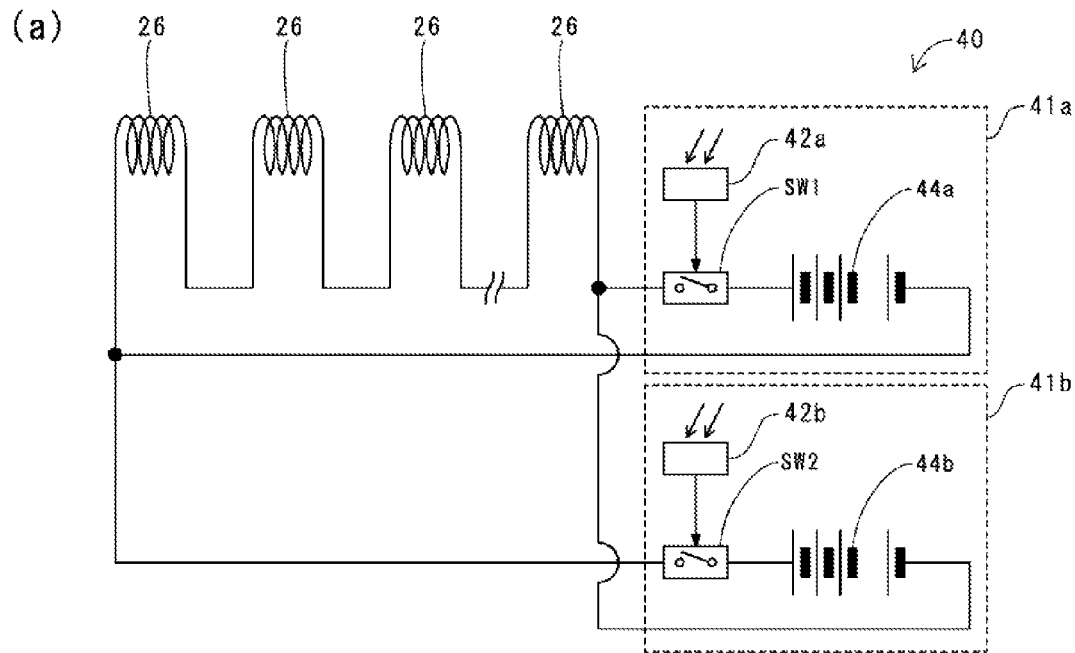
FIG. 4 includes diagrams showing an example of a control mechanism of the stepping motor according to the present invention.
Figure 4:
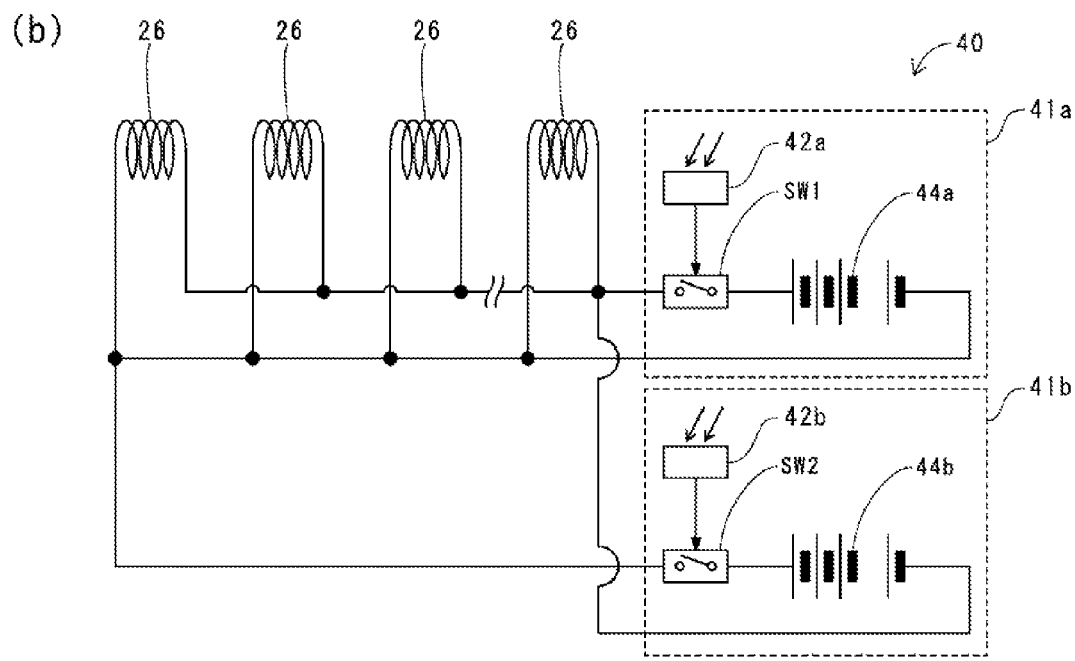

Next, an example of a preferred control mechanism 40 of the stepping motor 50 according to the present invention will be described using FIG. 4. Here, FIG. 4 includes diagrams showing a control part, of the control mechanism 40, for the exciting coils 26 of a single phase group. However, the control mechanism 40 according to the present invention is not particularly limited to this configuration, and any mechanism may be used as long as it detects the position of the permanent magnet 22 and switches turning on/off of current application to the exciting coil 26 and the application direction.

The control mechanism 40 shown in FIG. 4(a) and FIG. 4(b) includes a first drive unit 41a and a second drive unit 41b connected in parallel to the exciting coils 26 of a single phase group. Moreover, the first drive unit 41a and the second drive unit 41b include well-known direct-current power supplies 44a and 44b such as batteries for exciting the exciting coil 26, well-known switching means SW1 and SW2 such as solid state relays connected in series to the direct-current power supplies 44a and 44b, respectively, and optical sensors 42a and 42b that turn on/off the switching means SW1 and SW2, respectively, according to the position of the permanent magnet 22.

Moreover, when the permanent magnet 22 (22a) has reached the position shown in FIG. 3(a), the optical sensor 42a detects this position to turn on the switching means SW1. The exciting coil 26 is thereby applied with current from the direct-current power supply 44a to be excited such that the front end 26a of the exciting coil 26 becomes an S-pole and the rear end 26b becomes an N-pole. Repulsion and attraction thereby act between the permanent magnet 22 and the exciting coil 26, and the rotator 30 rotates.

Next, when the rotator 30 has rotated to reach the position shown in FIG. 3(b), the optical sensor 42a detects this position to turn of the switching means SW1. The current application to the exciting coil 26 is thereby stopped.

Next, when the rotator 30 has further rotated to reach the position shown in FIG. 3(c) the optical sensor 42h detects this position to turn on the switching means SW2. When the switching means SW2 is turned on, the exciting coil 26 is applied with current in an opposite direction to the above from the direct-current power supply 44b to be excited such that the front end 26a of the exciting coil 26 becomes an N-pole and the rear end 26b becomes an S-pole. Repulsion and attraction thereby act between the permanent magnet 22 and the exciting coil 26, and the rotator 30 rotates.

Next, when the rotator 30 has rotated so that the front end of the permanent magnet 22c has reached a position substantially equal to the rear end 26b of the exciting coil 26 of this phase group, the optical sensor 42b detects this position to turn off the switching means SW2. The current application to the exciting coil 26 by the direct-current power supply 44b is thereby stopped. Moreover, as a result of these operations being repeatedly performed for exciting coils 26 including the exciting coils 26 of other phase groups, the rotary shaft 10 of the stepping motor 50 continuously rotates.

As above, the stepping motor 50 according to the present invention uses permanent magnets 22 each having inside a substantially cylindrical inner peripheral surface, and is disposed with a substantially columnar exciting coil 26 inside the inner peripheral surface. Moreover, turning on/off of current application to the exciting coil 26 and the application direction are switched when the permanent magnet 22 and the exciting coil 26 have reached a specific position. Repulsion and attraction that act on both ends of the exciting coil 26 can thereby be made to contribute to a rotary motion of the stepping motor 50. Therefore, the stepping motor 50 according to the present invention can obtain a high conversion efficiency.

However, the stepping motor 50 according to the present invention and the respective units of the control mechanism 40 are not particularly limited to the examples described above in configuration, shape, and operation, the number and disposition of permanent magnets and exciting coils, etc., and the present invention can be implemented by being modified within a range not departing from the gist of the present invention.

DESCRIPTION OF THE SYMBOLS

10 Rotary shaft
12 Stator
20 Rotating plate
22 Permanent magnet
26 Exciting coil
26a Front end of (exciting coil)
26b Rear end of (exciting coil)
50 Stepping motor

What is claimed is:
1. A stepping motor comprising:
a rotary shaft pivotally supported on a stator;
a rotating plate fixed to the rotary shaft; a plurality of permanent magnets fixed to the rotating plate and disposed at equal intervals concentrically around the rotary shaft and so as to have alternating magnetic polarities; and
a plurality of exciting coils fixed to the stator and being in substantially columnar shapes,
said permanent magnet having an inner peripheral surface that is homopolar inside and in a substantially C-shape, said exciting coil being disposed inside the inner peripheral surface of the permanent magnet, said rotating plate rotating as a result of the permanent magnet moving such that the exciting coil passes by inside the inner peripheral surface due to magnetization of the exciting coil, wherein the exciting coil has a length longer than a pitch interval of the permanent magnets adjacent to each other, and where, of both ends of the exciting coil, a side of the exciting coil toward which the permanent magnet heads is provided as a front end, and a side from which the permanent magnet separates is provided as a rear end and a side of both ends or the permanent magnet that heads toward the exciting coil is provided as a front end, the exciting coil is excited such that, when a substantially center of the permanent magnet has reached a position beyond the rear end of the exciting coil, the front end and rear end of the exciting coil and permanent magnets located at both end portions of the exciting coil respectively repel, and when the front end of the permanent magnet has reached a position substantially equal to the rear end of the exciting coil, excitement of the exciting coil is stopped.

* * * * *